March 1, 1949. R. P. CARLTON 2,463,241
APPARATUS FOR THE MANUFACTURE OF ABRASIVES
Original Filed Jan. 20, 1930 3 Sheets-Sheet 1
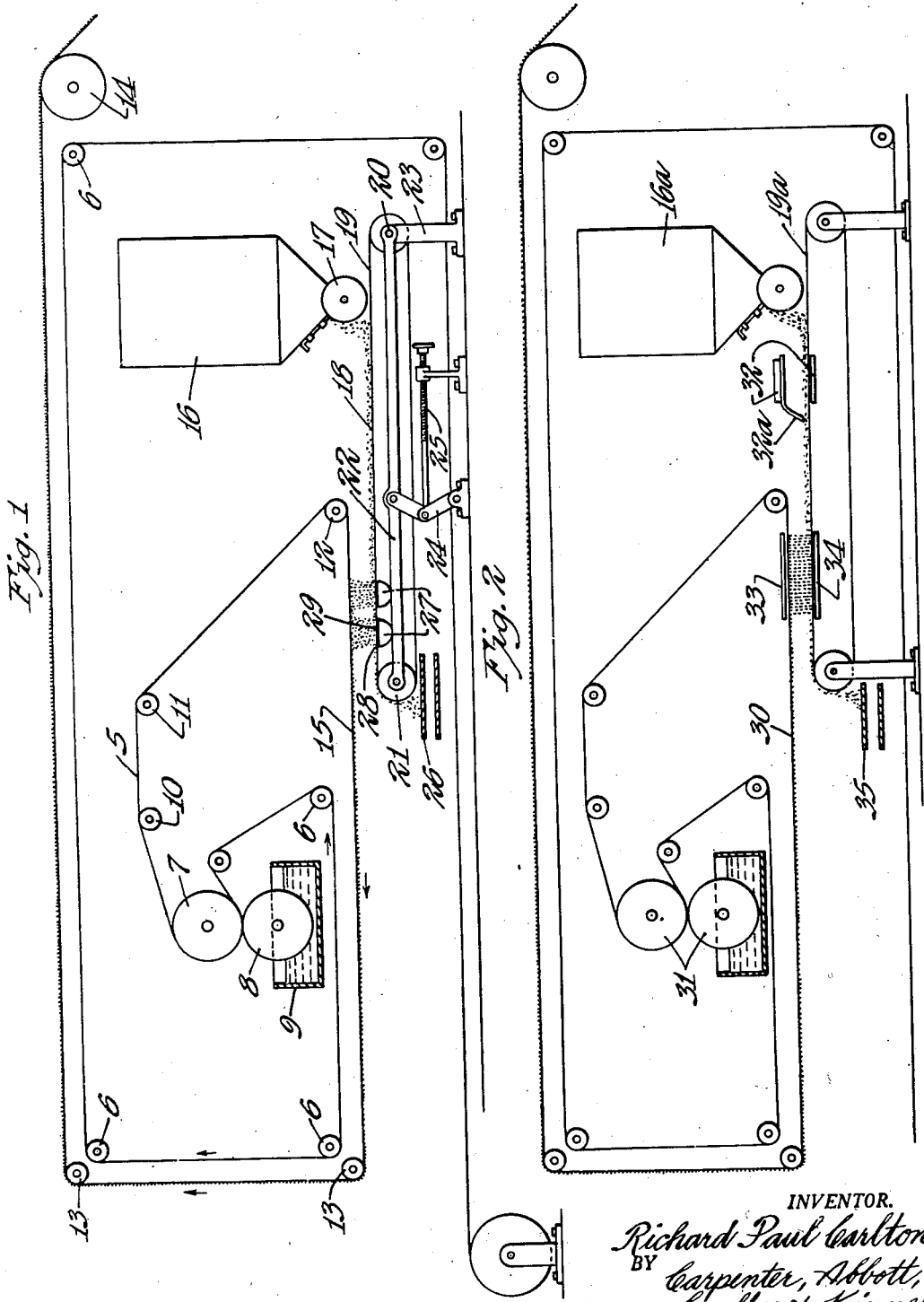
INVENTOR.
Richard Paul Carlton
BY Carpenter, Abbott,
Coulter & Kinney
ATTORNEYS

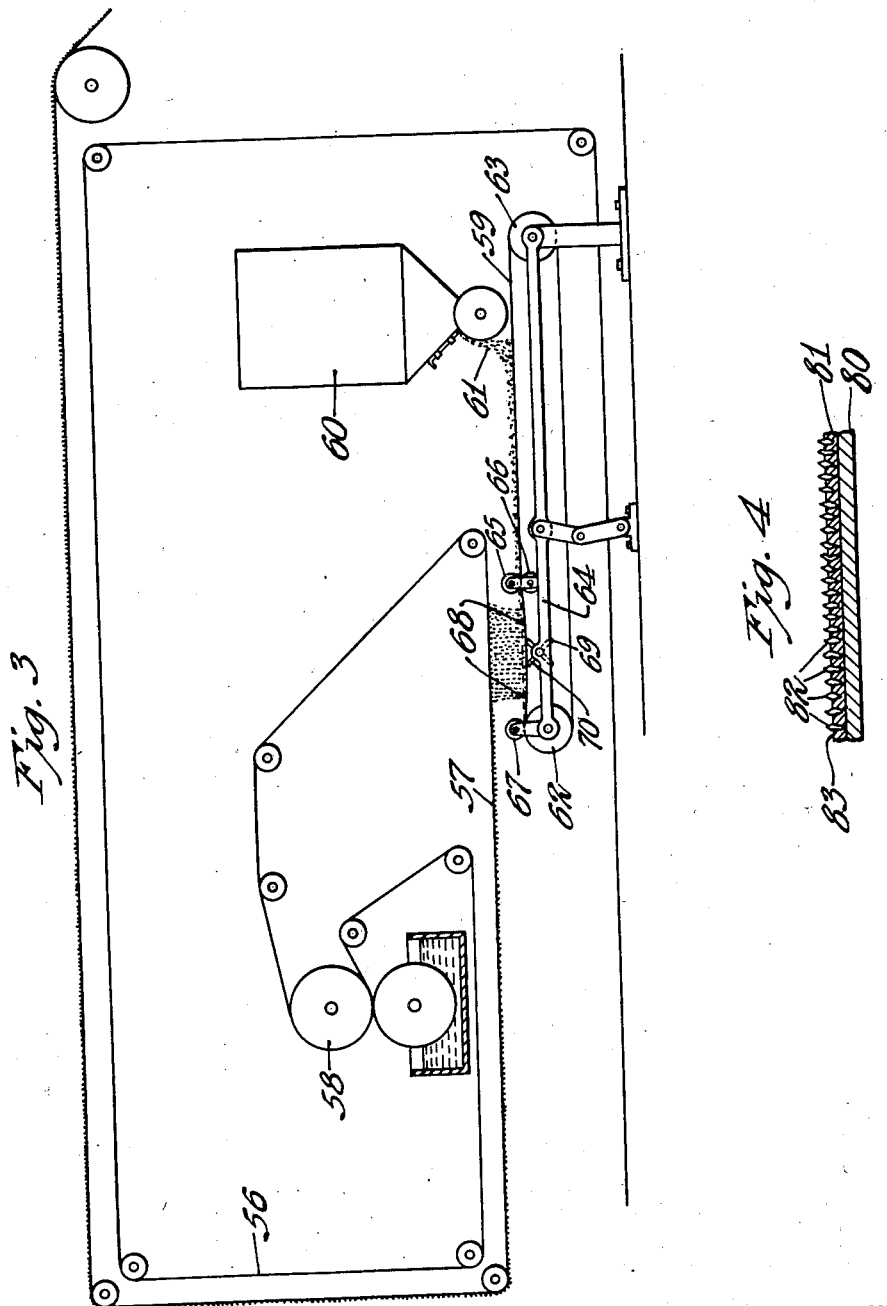

March 1, 1949. R. P. CARLTON 2,463,241
APPARATUS FOR THE MANUFACTURE OF ABRASIVES
Original Filed Jan. 20, 1930 3 Sheets-Sheet 3
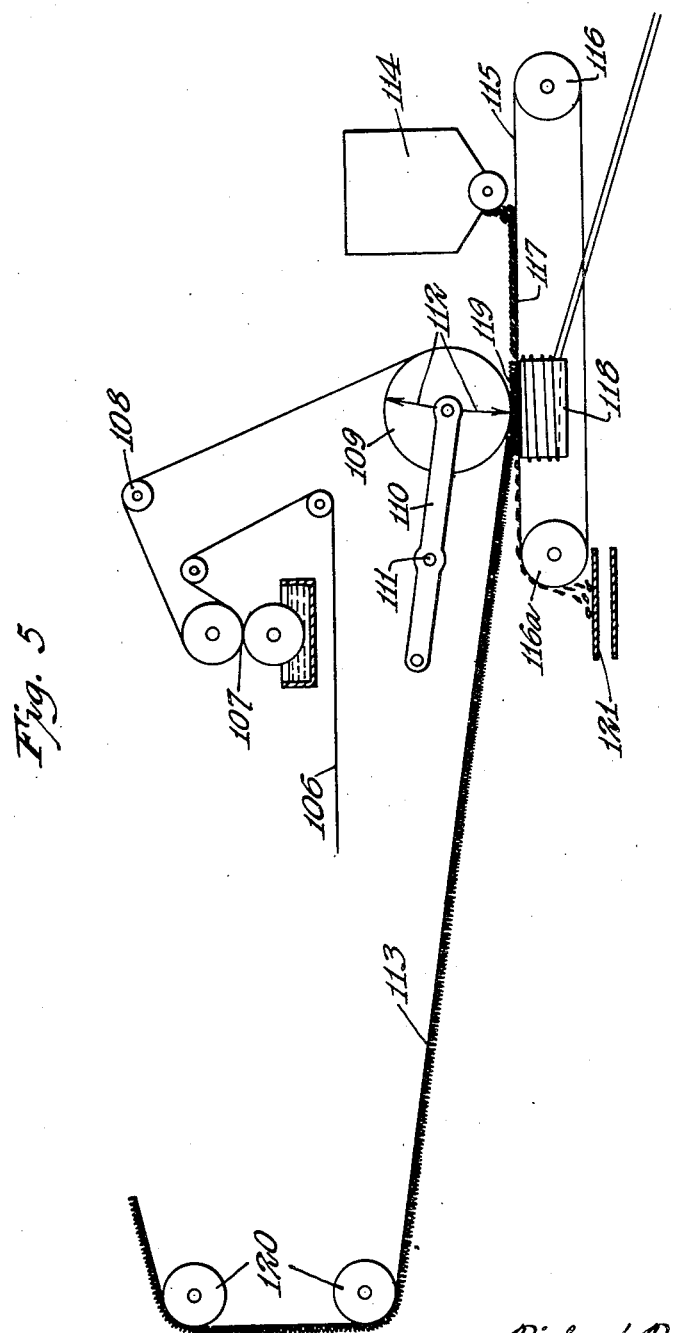

Patented Mar. 1, 1949

2,463,241

UNITED STATES PATENT OFFICE 2,463,241

APPARATUS FOR THE MANUFACTURE OF ABRASIVES

Richard Paul Carlton, St. Paul, Minn., assignor, by mesne assignments, to Behr-Manning Corporation, Troy, N. Y., a corporation of Massachusetts Application July 8, 1941, Serial No. 401,484, which is a division of application Serial No. 422,065, January 20, 1930. Divided and this application May 19, 1945, Serial No. 594,753

8 Claims. (Cl. 91—18)

This invention relates in general to coated articles and to the art of coating, and more particularly to an improved method of and apparatus for applying pulverulent coatings to suitably adhesively coated surfaces, and while the invention finds particular utility in the art of making flexible abrasives, and is, therefore, described and illustrated for this purpose, it finds a wide field of utility for analogous purposes.

This application is a division of my copending application Serial No. 401,484, Patent No. 2,376,342, filed July 8, 1941, as a division of my application Serial Number 422,065, filed January 20, 1930, now Patent No. 2,318,570, granted May 4, 1943.

It is well known that in the art of making sandpaper, emery paper or cloth and similar abrasive articles, a flexible or in some cases, a rigid, backing of paper, cloth, wood or the like is employed, to which is applied a coating of an adhesive substance, such as animal or vegetable glue, or where a waterproof article is desired, the backing may be coated with any of the now well known waterproof adhesives for this purpose, and while the coating is still wet or unset, a suitable abrasive material such as garnet, corundum, sand or the like is applied thereto. The grains of abrasive substances are usually applied by gravity upon the upper adhesive coated surface of the backing, and they lie in the adhesive material in haphazard fashion due to the elongated nature of the abrasive particles, and in a large degree, the facets or cutting edges of the individual grains or grits often lie flat upon or are embedded in the adhesive coating in such a manner that in some instances their best cutting edges never come into contact with the work or at best are brought inefficiently into contact therewith. The invention here has as one of its objects to measurably increase the number of grits whose longer or greater dimensions are in a plane perpendicular to the surface of the backing, thereby to present more efficiently the cutting edges to the work, and increase the cutting ability and life of the abrasive article.

It will be understood that in ordinarily depositing mineral, that is, pulverulent abrasive material solely under the force of gravity onto a backing, it acquires a velocity due to the action of gravity. As the grits pass through the intervening air space, there will be caused some change in their positions en route to the sheet or backing, but ordinarily neither the velocity given to the grits or the effect of the air on them is sufficient to cause them to become aligned so as to assume positions substantially perpendicular to the backing. It is, therefore, necessary that independent force be applied to the grits, and I have found that by passing the grits through a static field of electric energy or of electro-magnetic energy or by mechanically imparting this force to the grits a much greater number of the individual particles will assume erect positions on the backing, which will enhance its cutting ability.

In carrying out this invention, I find it desirable to employ a conveyor for conducting the mineral at rest relative to the conveyor by relatively slow speed to a point adjacent to which the independent force is applied for projecting the particles of grit onto the backing. I find that by then applying this independent force, be it mechanical or electrostatic or electro-magnetic. I am able to impart a high velocity to the particle so that any force of gravity acting on the particle, whether in the same direction, in a counter direction, or in a direction angularly to that at which the force is applied, will be relatively small compared to this force applied. It is possible with the present invention to apply the force directly counter to gravity, that is, by bringing the grits beneath the backing or by applying the force in some other direction as long as the force of gravity and the effect of air is reduced below a point which will interfere with the result desired, namely, the projection of the grits with their longitudinal dimensions ultimately perpendicular or substantially so with respect to the backing.

The principal objects and advantages of this invention reside in the provision of an improved abrasive coated article, such, for example, as sandpaper, emery cloth. or the like, wherein the abrasive grits or grains lie in position on the backing for increasing the cutting effect and durability of the abrasive article; the provision of an improved abrasive article wherein the abrasive grits are disposed so that their cutting facets are presented in position to more efficiently engage the work and thereby produce a sharper article; the provision of an improved abrasive article wherein the abrasive grains or grits are applied thereto with their longer or greater dimension substantially perpendicular to the plane of the backing; the provision of an improved abrasive article which may be flexible or rigid, as desired, and which may or may not be made waterproof, that is, suitable for employment in a water abrading operation.

This invention further includes as objects and advantages thereof, the provision of an improved apparatus for manufacturing abrasive articles;

the provision of an improved apparatus for applying pulverulent material to one surface of a backing irrespective of the force of gravity, that is, against the normal tendency of the force of gravity; the provision of an improved apparatus for propelling a pulverulent material, such as a grit or an abrasive grain, against an adhesive coated surface; the provision of an improved apparatus for the purpose set forth and including electrically operated means for acting on an abrasive grain or pulverulent material and causing it to advance onto the adhesive coated backing irrespective of the force of gravity; the provision of an improved apparatus for causing the particles of pulverulent material to impinge upon and assume a position in the adhesive coated surface substantially normal or perpendicular to the surface of the backing; the provision of an improved apparatus for propelling a pulverulent material onto a moving sheet in a direction transversely to the plane of movement thereof and in a direction substantially counter to gravity; the provision of an improved apparatus for making abrasive articles, such as sandpaper and the like, which includes the application of a grit to the under side of the backing; the provision of an improved apparatus which includes means for feeding and applying a pulverulent material counter to the force of gravity and simultaneously with movement of the backing; the provision of an improved means for moving a web of paper and applying an adhesive thereto and including means arranged below and for operating synchronously with for applying a pulverulent material to the under side of said moving backing; and the provision of an apparatus of the character described wherein improved electrostatic or electromagnetic means may be employed, acting on the abrasive material and causing it to move at an accelerated speed toward the sheet so as to cause it to impinge thereon in the adhesive coating and thereby present the cutting edges of the abrasive grits away from the surface of the backing and thus increase the cutting ability and life of the abrasive article.

The apparatus of this invention includes a number of alternative forms for mechanically or electrically carrying out the steps of the process, and to this end is provided an improved pneumatic means and improved vibrator structure for mechanically propelling the pulverulent material and improved electro-magnetic structure for acting on the mineral and causing it to move in a cloud toward the adhesive coated surface of the moving web or backing.

The foregoing and such other objects and advantages as may appear or be pointed out as this description proceeds are attained in the structures illustrated in the accompanying drawings in which:

Figure 1 is a schematic view illustrating one form of apparatus for carrying out the process of this invention;

Figure 2 is a view similar to Figure 1 of an alternative form of the invention;

Figure 3 is a further alternative form of the apparatus of this invention employing mechanical vibrating means;

Figure 4 is an enlarged schematic view illustrating a portion of an abrasive article made in accordance with this invention; and Figure 5 is a further alternative form of apparatus for carrying out one of the methods of this invention.

The method of operation of the present invention includes as steps thereof the feeding of a web or strip of paper or other fabric at a predetermined rate of speed, applying an adhesive substance to the under side of the sheet, or applying the adhesive coating to one side and then moving the sheet with the coated side out, and simultaneously with the movement of the coated sheet, causing a grit or abrasive material to be applied to this side. The sheet or web of paper may be moved so that the adhesive coated side is either presented downwardly or at any angle thereto. The movement of the abrasive grains onto the under side of the backing is done irrespective of the force of gravity and, in fact, directly counter to gravity, and preferably done by imparting relatively high velocity to the abrasive material, thus causing it to impinge upon the adhesive coating. In view of the fact that the abrasive grains are projected through an intervening space from a suitable carrier onto the adhesive coated side irrespective of or counter to the force of gravity, the grains, which are usually somewhat elongated, will assume a position in transit so that the longer dimension thereof will take a position normal to the surface of the backing, thus causing the grains to "stand" on the surface rather than lie flat in greater percentage than when they are deposited by gravity. It is to be understood that this movement of the grains and deposition of them on the coated surface may be carried out in a number of ways, either by vibration, by an air blast, or by electrostatic or electro-magnetic means.

This invention produces a very satisfactory piece of sandpaper in which the cutting ability is measurably increased and by the deposition of the grains of sand or grit irrespective of the force of gravity, it is possible to produce an orientation of the mineral as desired and to control the thickness of the abrasive coating much more readily than where gravity alone is relied upon or employed for depositing the grains on the sheet.

The apparatus of this invention may take any one of the forms shown in the drawings, and in the form of the invention shown in Figure 1, air pressure is resorted to for producing the mineral cloud and for projecting the mineral onto the moving web.

Referring now more particularly to Figure 1, the flexible backing 5 of paper or cloth or other fabric is trained or fed over a series of rollers 6, 6, and over one of a pair of the squeeze rollers indicated at 7, the other roller 8 of said pair being in contact with an adhesive material contained in a tray or tank 9 by which an adhesive coating is applied to one side of the moving web. After receiving the adhesive coating, the web 5 is trained over rollers 10 and 11 and is brought back over a roller 12 so that the adhesive coated surface of said web is presented downwardly. The web may then be trained over rollers 13, 13, and fed to a suction drum 14, whence it passes into festoons for drying.

The mineral is supplied from a hopper 16 and a conventional outlet 17 which feeds a layer 18 of mineral to a moving conveyor 19. This conveyor 19 is preferably porous and passes over the feeding rollers 20 and 21 and is adapted to move at a suitable rate of speed to supply a sufficient quantity of abrasive grain. In some cases, it has been found advantageous to move the conveyor at a speed substantially the same rate of speed as the web 15, although these speeds are, of course, variables. The rollers 20 and 21 are mounted in the ends of a suitable frame 22, and this frame may be raised and lowered so as to vary the distance between mineral conveyor 19 and the moving web 15. This frame 22 may be supported fixedly at one end, as indicated at 23, and the other end may be raised and lowered by a toggle arrangement 24 activated by a threaded rod 25. Below the conveyor 19 and at the movable end thereof, that is, adjacent to the web 15, there is provided a second conveyor 26 which serves to conduct away excess mineral which flows over the end of the conveyor 19 and which may be returned in any suitable manner to the mineral hopper.

Below the upper flight of the conveyor 19, there are provided two air troughs 27. These air troughs are provided with flat upper walls 28, having slots 29 therein, said slots extending across the width of conveyor 19 and the troughs themselves being connected to a suitable source of air under pressure.

These troughs form in effect elongated jets or nozzles and when so placed below the conveyor belt or frame 22, a small quantity of air is emitted at high velocity which passes through the porous belt or conveyor.

It will be understood that when a blast or blasts of air are delivered from the troughs 27, this blast of air passes through the porous conveyor 19 and blows the mineral from the conveyor against the under side of the flight 15 so that the mineral is caused to strike into the adhesive at a relatively high velocity and become impinged therein. Owing to the projecting of the mineral in this manner through the intervening air space, the individual particles of grit or abrasive material are caused to assume a position parallel to their trajectory, that is, with their longer dimension perpendicular to the surface of the flight 15. In view of the fact that most of the particles of mineral are somewhat elongated, due to the manner of production of the same, they will naturally assume this position in movement from the conveyor 19 to the adhesive coated surface of the backing. As they arrive at the adhesive material, they impinge themselves thereon and will thus stand erect in the adhesive, thus forming a sharper contour for abrasive purposes. By varying the rate of speed of the moving backing relatively to the speed of the conveyor and by varying the distance between the conveyor and the backing and the velocity of the air stream, and by increasing or reducing the number of such jets and the quantity of adhesive applied, any reasonable desired thickness of grit layer may be produced during the process and without stopping the apparatus. It will be understood that the excess mineral carried by the conveyor may be dumped into the conveyor 26 and returned by any suitable means to the hopper 16.

Referring now to Figure 2, there is provided the same general arrangement of moving backing, having the flight 30 adhesively coated from the squeeze rollers 31.

Below the flight 30 there is provided a mineral feeding conveyor 19a, receiving pulverulent material from the hopper 16a.

The conveyor 19a is mounted for movement toward and away from the flight 30 similar to the conveyor 19 and, therefore, this structure has not been shown in Figure 2.

As the mineral flows from the hopper 16a it does not always assume a smooth or even distribution on the conveyor 19a, and, therefore, it may be desirable to provide a pair of charged electrodes 32, one arranged above and one below the conveyor 19a, for the purpose of spreading the mineral evenly on the conveyor belt. The conveyor 19a in this instance may be non-porous.

When charged electrodes are put in this position they act in principle the same as the charged electrodes used for coating the mineral on the backing. An electrical charge or difference of potential is set up between the electrodes 32. The voltage or difference in potential between those electrodes is maintained great enough to produce a strong electrostatic field, but not so great as to break down the insulation between the plates, which insulation may be the dielectric strength of the air or the dielectric strength of the air plus the dielectric strength of any insulating material which may be used to wrap the electrodes.

As the mineral on the conveyor enters the static field between the plates the mineral particles take on the charge of the lower plate, and are repelled to the upper plate where they lose their charge and take on the opposite charge of the upper plate. At this point they are repelled to the lower plate. Since new mineral is being conveyed by the conveyor into the field continuously the static fields soon become supersaturated with mineral particles, and an equilibrium is reached where as many particles are thrown out of the static field as are brought in by the conveyor. By having a down-turned end 32a of the upper electrode the mineral particles that are thrown out of the static field are deflected evenly on the conveyor belt so that a smooth coating of abrasive grit is first placed on the conveyor.

The use of an electrostatic field for getting a smooth coating of mineral on the conveyor belt is not necessary to the invention but is an additional means of obtaining evenly distributed abrasive coatings, and is also a means for avoiding the use of any excess mineral on the conveyor. When the mineral is evenly coated on the conveyor at the time it is being coated, streaks, thin spots, etc., in the finished product are reduced.

At the same approximate point at which troughs 27 are provided in Figure 1 there are here provided electrically charged electrodes 33 and 34, the electrode 34 being located below the upper flight of the conveyor belt 19a and electrode 33 being disposed above the flight 30 of the backing. A sufficient difference of potential is maintained at electrodes 33 and 34 to produce a strong electrostatic field, similarly to that referred to above. This electrostatic field moves the mineral from the belt 19a to the underside, which is the adhesive coated surface of the flight 30.

As the mineral enters the electrostatic field between the electrodes 33 and 34 it becomes charged with the charge of the lower plate, and is here propelled to the upper plate 33.

It will be observed that in this method of coating the mineral is applied by a force other than gravity. In all other methods of coating sandpaper, known to me, the velocity of the particle is either in whole or part given to it by the force of gravity. In the case of this electrostatic coating the particles are oriented in the electrostatic field so that there is a tendency for the long dimension of the mineral to be perpendicular to the electrode plates, and also perpendicular to the web 30, which is being coated. The finished sandpaper product, therefore, contains a substantial percentage of the particles of mineral standing on end rather than laying flat, thereby increasing the cutting properties of the abrasive article.

Excess mineral is dumped onto the conveyor 35, whence it may be returned to the hopper 16a.

Referring now to the form of the invention shown in Figure 3, the moving web 56 is trained over a series of rollers similar to the arrangement shown in Figures 1 and 2 so that a horizontal flight 57 of the paper backing is provided, having an adhesive coating on the under side thereof. Squeeze rollers 58 engage the paper backing for applying an adhesive thereto.

In this form of the invention, a mechanical vibrating means is provided which serves to propel the mineral, that is, the grit, from the grit-feeding conveyor 59, which latter receives mineral from the hopper 60, having a gate 61. The conveyor 59 is trained over rollers 62 and 63 mounted in a suitable frame 64, which latter may be mounted for adjustment toward and away from the flight 57 similarly to the conveyor 19 of Figure 1. The conveyor 59 extends below and is separated from the flight 57 of the paper web and travels at substantially the same speed as the paper web.

The conveyor 59 passes between sets of pinch rollers, one above and one below the upper flight of the conveyor 59, as indicated by 65 and 66, and also beneath a pinch roller 67 which bears on the roller 62. The pinch rollers 65 and 66 tend to distribute the mineral evenly over the surface of the conveyor and are so spaced from the rollers 62 and 67 that the portion of the belt 59 between the rollers 65 and 66, and 62 and 67 is permitted to lie slack, whereas the remaining part of the conveyor is substantially taut. This arrangement tends to limit the vibration of the conveyor belt to the zone of application of the mineral to the paper backing, as indicated at 68.

Beneath the portion 68 of the belt 59, there is provided a revolving batter 69 operating on a shaft carried in suitable bearings in the frame 64 and provided with a plurality of radial arms 70 which upon rotation rigidly strike the under side of the portion 68 of the belt, thus throwing or projecting the mineral content thereof against the under side of the adhesive coated paper backing, much in the manner in which the air stream blows the mineral or grit against the paper backing as shown in Figure 1. The batter 69 may be driven in any desired manner from a separate source of power or may be connected suitably with the rollers driving the belt 59, but geared to operate at a greater rate of speed. The rollers 65 and 66 and the roller 67 are separately driven from the belt 59 so as to produce the tautness in the belt, except the flight of the belt indicated at 68.

In Figure 4, there is illustrated an article made in accordance with the present invention. The backing is shown at 80 to which an adhesive coating 81 has been applied, and the grits, greatly enlarged, are indicated at 82, and it is noted that they stand on end in the adhesive coating, thus causing their sharper edges to project beyond the upper or outer surface of the coating, thereby enhancing the cutting ability and increasing the life of the abrasive article. While the article shown in Figure 10 is purely schematic, it will be understood that the mineral actually does take a position substantially normal to the backing and, while all of the grits may not take this position, a large number of the same do, and the cutting qualities of the abrasive article are thus greatly increased. Furthermore, by so disposing the grits, it permits of the application of an additional sizing coat or coats to the back and to the front or cutting face of the abrasive material without completely burying the grits and as a thicker coat of adhesive may thus be employed on the cutting face of the abrasive material, the engagement of the adhesive material with the abrasive material is greatly enhanced, thus further tending to increase the life of the abrasive article. Such a sizing coat is indicated at 83.

Referring now in detail to Figure 5, there is further illustrated there an apparatus for applying the grit to the adhesively coated backing by an electro-magnetic means. In this form of the invention a moving web is provided indicated at 106, this web being a flexible strip of paper which is suitably adhesively coated by a mechanism indicated generally at 107.

The moving web thus adhesively coated is carried over a roller 108, thence over a roller 109, said roller 109 being mounted on a shaft carried in a bearing arm or arms 110 pivotally mounted at 111, whereby the roller 109 may be raised and lowered in the substantially vertical plane of the arrows 112, thus permitting the lower flight 113 of the paper web to be elevated or depressed, as the case may be.

Mineral is deposited from a hopper 114 onto a conveyor 115 trained over rollers 116 and 116a, the upper flight 117 of said conveyor passing beneath the roller 109 and the moving web and conveying mineral, that is, the grit, to a point adjacent to the roller 109.

Preferably immediately below the axis of the roller 109 and below the upper flight 117 of the conveyor 115 I provide an electro-magnet 118 which is so mounted that its magnetic flux passes through the conveyor and causes the mineral particles to stand erect, as indicated at 119, as they move along with the upper flight of the conveyor. While the mineral particles are thus standing erect they come into contact with the adhesively coated side of the paper backing and are thus picked up by it and conveyed away, the backing being trained over rollers 120 and carried to the festoons similarly to the other forms of the invention. It will be observed that the angularity of the lower stretch 113 of the paper web is such that it lies upwardly to the conveyor 115. In this way the particles of grit adhering to the paper are not knocked down by other partices remaining on the conveyor, it being understood that the grit is fed somewhat in excess of the required amount so that an adequate amount will be deposited on the adhesively coated side of the backing. The excess mineral drops off the conveyor 117 and is carried to a collecting means by a conveyor 121.

It will be understood that by varying the amount of mineral fed from the hopper, the strength of the electro-magnet, that is, the strength of the flow current transferred, and the position of adjustment of the roller 109 the assembly, may all be properly correlated for obtaining the desired grade of finished article.

It may be desirable that a certain amount of pressure be exerted on the erect particles of mineral so as to cause them to impinge upon the adhesively coated side of the paper and thus, by manipulation of the arms 110, an adjustment of the pressure of the roller 109 may be attained.

I wish to point out that where the expressions "electro-magnetic" and "electrostatic" are employed in the specification, I will refer to the employment as well of a permanent magnet or some other form of static charge or magnetic charge which will perform the function.

Having thus described my invention and illustrated its use, what I claim as new and desire to secure by Letters Patent is:

1. In apparatus for the manufacture of abrasive coated sheet material, a carrier for a layer of abrasive particles on a surface thereof, means creating a magnetic field to cause said abrasive particles to stand substantially erect upon said carrier surface, and means comprising an element having a surface spaced from said carrier surface to bring an adhesive coated surface of sheet material into embedding contact with said abrasive particles while so positioned upon said carrier surface.

2. In apparatus for the manufacture of abrasive coated sheet material, an abrasive carrier, means for distributing a layer of abrasive particles upon a surface of said carrier, means creating a magnetic field acting upon said abrasive particles to position them substantially erect upon said carrier surface, means for adhesively coating one surface of a sheet material and means comprising an element having a surface spaced from said carrier surface for bringing said adhesive coated surface into embedding contact with said layer of abrasive particles while so positioned upon said carrier surface.

3. Apparatus for the manufacture of particle coated sheet material, such as sandpaper, comprising a backing sheet and a coating of particles of material having unequal dimensions adhesively attached to the surface of said backing sheet, which comprises a carrier for said particles of material, means for depositing said particles of material in a substantially uniform layer on a surface of said carrier, means creating a magnetic field to orient said particles of material on said carrier surface with their major axes at a substantially uniform angle to said carrier surface, means for applying a coating of adhesive to the surface of said backing sheet, means for supporting said backing sheet including an element having a surface spaced from said carrier surface for bringing the adhesive coated surface of said backing sheet into close adjacency with said carrier surface and into embedding contact with said particles on said carrier surface, and means to remove said backing sheet from said adjacency to said carrier surface.

4. Apparatus for the manufacture of particle coated sheet material, such as sandpaper, comprising a backing sheet and a coating of particles of material having unequal dimensions adhesively attached to a surface of said backing sheet, which comprises a carrier for said particles of material, means for depositing said particles of material in a substantially uniform layer on a surface of said carrier, means for applying a coating of adhesive to a surface of said backing sheet, means for supporting said backing sheet including an element having a surface spaced from said carrier surface for bringing the adhesive coated surface of said backing sheet into close adjacency with said carrier surface and into embedding contact with said particles on said carrier surface and means to remove said backing sheet from said adjacency to said carrier surface, and means creating a magnetic field to orient said particles of material with their major axes at a substantially uniform angle to said surface of said backing sheet when said surface is brought into contact therewith.

5. Apparatus for the manufacture of particle coated sheet material, such as sandpaper, comprising a backing sheet and a coating of particles of material having unequal dimensions adhesively attached to a surface of said backing sheet with the major axes of said particles at a substantially uniform angle to said surface, which comprises a carrier for said particles of material, means for supporting said carrier and to impart continuous linear motion thereto, means for depositing said particles of material in a substantially uniform layer on a surface of said carrier, means for applying a coating of adhesive to a surface of a continuous web of said backing sheet, means for supporting said continuous web of backing sheet including means to impart continuous linear motion thereto and an element having a surface spaced from said carrier surface for bringing the adhesive coated surface of said backing sheet into close adjacency with said carrier surface and into embedding contact with said particles on said carrier surface and means to remove said backing sheet from said adjacency to said carrier surface, and means creating a magnetic field to orient said particles of material with their major axes at a substantially uniform angle to said surface of said backing sheet when said surface is brought into contact therewith.

6. Apparatus in accordance with claim 5 in which the carrier is a continuous belt.

7. An apparatus according to claim 1 wherein said field is created by an electromagnet.

8. An apparatus according to claim 1 wherein said magnetic means is positioned beneath the said carrier.

RICHARD PAUL CARLTON.

REFERENCES CITED

The following references are of record in the file of this patent:

UNITED STATES PATENTS

| Number | Name | Date |
| --- | --- | --- |
| Re. 22,419 | Smyser | Jan. 11, 1944 |
| 265,940 | Baeder | Oct. 17, 1882 |
| 1,775,110 | Porter | Sept. 9, 1930 |
| 2,027,087 | Buckner | Jan. 7, 1936 |
| 2,027,307 | Schacht | Jan. 7, 1936 |